(12) United States Patent
Oshidari

(10) Patent No.: US 7,621,835 B2
(45) Date of Patent: Nov. 24, 2009

(54) IN-WHEEL DRIVE UNIT

(75) Inventor: Toshikazu Oshidari, Yokosuka (JP)

(73) Assignee: Nissan Motor Co., Ltd., Yokohama (JP)

(*) Notice: Subject to any disclaimer, the term of this patent is extended or adjusted under 35 U.S.C. 154(b) by 328 days.

(21) Appl. No.: 11/543,136

(22) Filed: Oct. 5, 2006

(65) Prior Publication Data
US 2007/0078035 A1    Apr. 5, 2007

(30) Foreign Application Priority Data
Oct. 5, 2005    (JP) .............................. 2005-292264

(51) Int. Cl.
*F16H 3/72*    (2006.01)
(52) U.S. Cl. .......................................... 475/5; 180/372
(58) Field of Classification Search ..................... 475/5; 180/65.1, 65.5, 65.6, 372
See application file for complete search history.

(56) References Cited

U.S. PATENT DOCUMENTS

| | | | | |
|---|---|---|---|---|
| 3,812,928 A | * | 5/1974 | Rockwell et al. | 180/65.5 |
| 3,954,026 A | * | 5/1976 | Rittmann et al. | 74/411.5 |
| 4,040,312 A | * | 8/1977 | Tappan et al. | 475/83 |
| 5,156,579 A | * | 10/1992 | Wakuta et al. | 475/161 |
| 5,382,854 A | * | 1/1995 | Kawamoto et al. | 310/67 R |
| 5,588,931 A | * | 12/1996 | Forster | 475/338 |
| 5,845,732 A | * | 12/1998 | Taniguchi et al. | 180/65.6 |

FOREIGN PATENT DOCUMENTS

| | | |
|---|---|---|
| JP | 2001-032888 | 2/2001 |
| JP | 2002-247713 | 8/2002 |

* cited by examiner

*Primary Examiner*—Sherry L Estremsky
*Assistant Examiner*—Erin D Bishop
(74) *Attorney, Agent, or Firm*—Global IP Counselors, LLP (57) ABSTRACT

An in-wheel drive unit basically has a motor, a motor casing member, a planetary gear set, a hub flange and a pair of bearings. The motor includes a rotor that is rotatably driven. The motor casing member covers the motor. The planetary gear set is arranged coaxially about the rotational axis of the rotor. The planetary gear set includes a sun gear coupled to the rotor, a ring gear supported on the motor casing member, at least one pinion gear operatively arranged between the sun gear and the ring gear, and a carrier supporting the pinion gear. The hub flange is fixedly coupled to the carrier. The bearings rotatably support the hub flange and the pinion gear. The bearings are disposed on opposite sides of the pinion gear with respect to an axial direction of the pinion gear.

15 Claims, 4 Drawing Sheets

IN-WHEEL DRIVE UNIT

CROSS-REFERENCE TO RELATED APPLICATIONS

This application claims priority under 35 U.S.C. § 119 to Japanese Patent Application No. 2005-292264 filed on Oct. 5, 2005. The entire disclosure of Japanese Patent Application No. 2005-292264 is hereby incorporated herein by reference.

BACKGROUND OF THE INVENTION

1. Field of the Invention

The present invention relates to a drive unit for an electric vehicle having a planetary reduction gearing. More specifically, the present invention relates to an in-wheel type drive unit having a motor and a planetary reduction gearing positioned on the internal circumference side of a wheel rim.

2. Background Information

Japanese Laid-Open Patent Publication No. 2002-247713 discloses one example of a conventional in-wheel drive unit in which an output shaft is rotatably supported by bearings and operatively coupled to a hub flange of a wheel rim, with a reduction planetary gear train and a motor arranged along the axis of rotation. Japanese Laid-Open Patent Publication No. 2001-032888 discloses another example of a conventional in-wheel drive unit in which an output shaft is rotatably supported by bearings and operatively coupled to a hub flange, but with a pair of reduction planetary gear sets arranged along the axis of rotation and a motor arranged around the outer circumference of the planetary reduction gear sets.

In view of the above, it will be apparent to those skilled in the art from this disclosure that there exists a need for an improved in-wheel drive unit. This invention addresses this need in the art as well as other needs, which will become apparent to those skilled in the art from this disclosure.

SUMMARY OF THE INVENTION

In order to support moment force inputted to an axle, bearings support the axle at two points spaced apart in the axial direction. In the conventional in-wheel drive units disclosed in the above mentioned references, the distance between the two points (a support span) is relatively short, and the load applied to the bearings is relatively large. Therefore, it has been necessary to use a bearing with a high load capacity to handle the high load occurring in the conventional in-wheel drive units. Although lengthening the support span reduces the load, it also results in an increase in the overall length of the axle, thus posing a problem that the length of the whole drive unit becomes long.

Accordingly, one object of the present invention is to provide an in-wheel drive unit, which can make the axial length and the outer diameter of the in-wheel drive unit as small as possible.

In order to achieve the above mentioned object, an in-wheel drive unit is provided that basically comprises a motor, a motor casing member, a planetary gear set, a hub flange, a first bearing and a second bearing. The motor includes a rotor that is rotatably driven. The motor casing member covers the motor. The planetary gear set is arranged coaxially about the rotational axis of the rotor. The planetary gear set includes a sun gear coupled to the rotor, a ring gear supported on the motor casing member, at least one pinion gear operatively arranged between the sun gear and the ring gear, and a carrier supporting the pinion gear. The hub flange is fixedly coupled to the carrier. The bearings rotatably support the hub flange and the pinion gear. The bearings are disposed on opposite sides of the pinion gear with respect to an axial direction of the pinion gear.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
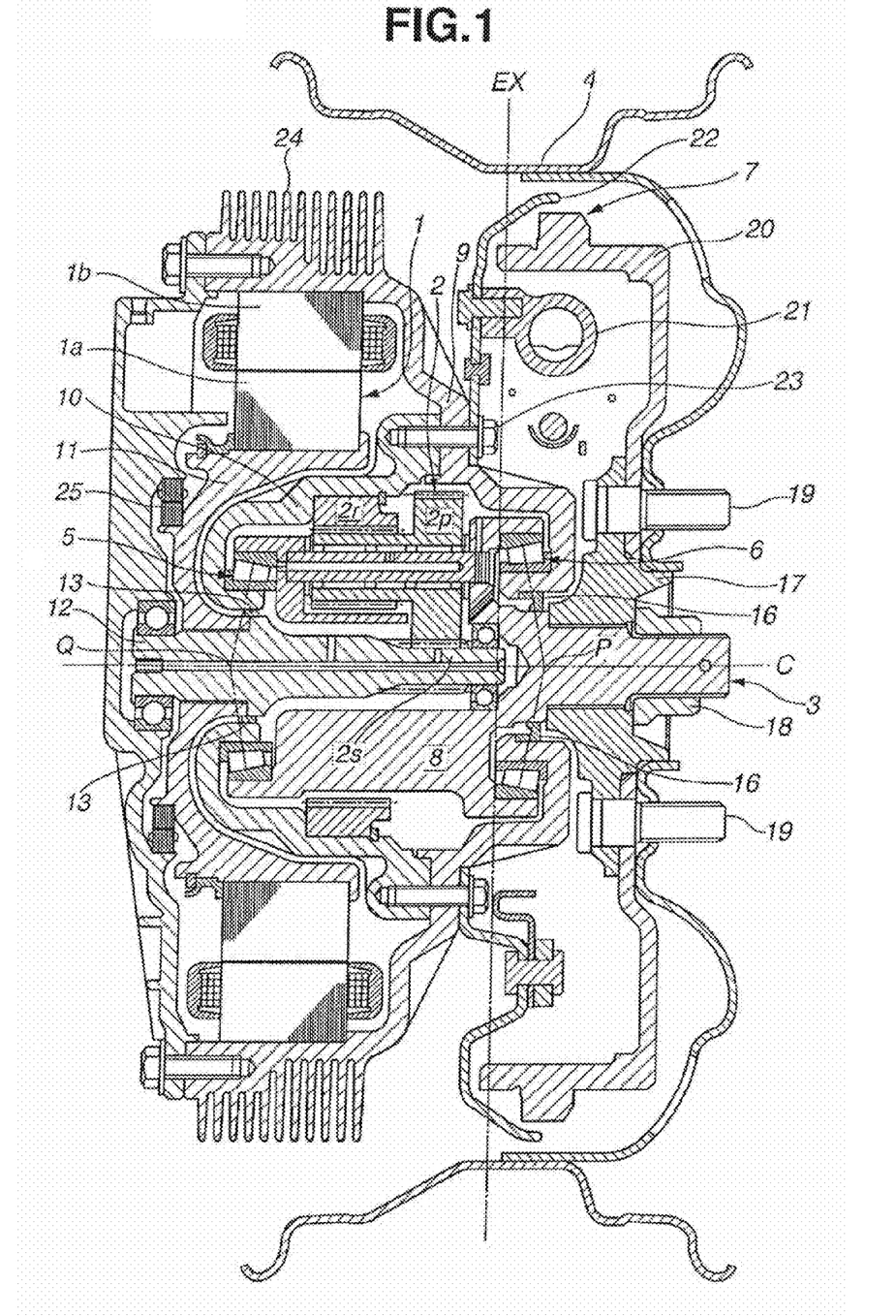
FIG. 1 is a schematic cross sectional view of an in-wheel drive unit taken along a center axis thereof in accordance with a first embodiment of the present invention.

Referring initially to FIG. 1, an in-wheel drive unit is illustrated in accordance with a first embodiment of the present invention. FIG. 1 is a schematic cross sectional view the in-wheel drive unit according to the first embodiment taken along a center axis C. In the first illustrated embodiment, the in-wheel drive unit basically includes a motor 1 with a rotor 1*a* and a stator 1*b*, a planetary reduction gearing 2 (a single planetary gear set), an output shaft 3, a wheel rim 4, a pair of bearings 5 and 6 (first and second bearings, respectively) and a braking device 7. Basically, the planetary reduction gearing 2 includes a sun gear 2*s*, a ring gear 2*r*, one or more pinion gears 2*p* (only one pinion gear 2*p* shown in FIG. 1) and a carrier 8 that supports the one or more pinion gears 2*p*. Moreover, as explained below in more detail, the bearings 5 and 6 are provided to rotatably support the carrier 8 (a rotary element) of the planetary reduction gearing 2 that is drivably coupled to the output shaft 3. At least one of the bearings 5 and 6 is disposed on an inner side with respect to a vehicle widthwise direction (left to right direction in FIG. 1) of a central vertical plane EX passing through a widthwise center points along a circumferential surface of the wheel rim 4. In this embodiment, the bearing 5 is disposed on the inner side with respect to the vehicle widthwise direction of the central vertical plane EX. The bearings 5 and 6 are configured and arranged to rotatably support the output shaft 3. The motor 1, the planetary reduction gearing 2, the output shaft 3 and the wheel rim 4 are operatively connected in this order such that driving force is transmitted from the motor 1 to the wheel rim 4 while reducing the speed.

The diameters of the bearings 5 and 6 can be made smaller than the diameter of the planetary reduction gearing 2. Thus, by positioning at least one of the bearings 5 and 6 on the inner side in the vehicle widthwise direction of the central vertical plane EX of the wheel rim 4, the maximum diameter portion of the planetary reduction gearing 2 can be placed outwardly toward an outer side (with respect to the bearing 5) in the vehicle widthwise direction by an axial length of the bearing 5 as compared to the conventional in-wheel drive unit. This arrangement permits arranging the motor 1 on the outer circumference side of the bearing 5 and a reduced diameter portion of the planetary reduction gearing 2 by avoiding placing the motor 1 on the outer circumference side of the maximum diameter portion of the planetary reduction gearing 2. Therefore, the overall axial length of the in-wheel drive unit is shortened in good balance with reduction of the outer diameter of the in-wheel drive unit excluding the wheel rim 4.

In addition, the bearings 5 and 6 are positioned on opposite sides of the planetary reduction gearing 2 with respect to the axial direction. Therefore, the support span between the bearings 5 and 6 for rotatably supporting the output shaft 3 and the rotary element of the planetary reduction gearing 2 that is drivably coupled to the output shaft 3 can be lengthened. Thus, it is possible to secure support rigidity of the bearings 5 and 6, and to lower the capacity of the bearings 5 and 6 required to bear a force in the vehicle widthwise direction, i.e., a lateral force, inputted from a tire (now shown) mounted to the outer periphery side of the wheel rim 4. Therefore, the size of the bearings 5 and 6 used in the in-wheel drive unit can be reduced. In addition, it is possible to place the braking device 7 on the outer circumference side of the bearing 6 that is positioned on the outer side of the planetary reduction gearing 2 in the vehicle widthwise direction, thereby increasing accumulation density (assembly density of the parts) of the in-wheel drive unit. In the first embodiment of the present invention, the planetary reduction gearing 2 includes a single planetary gearing mechanism.

Furthermore, in the in-wheel drive unit of the first embodiment, the rotary element of the planetary reduction gearing 2 that is drivably coupled to the output shaft 3 is the carrier 8. If the rotary element of the planetary reduction gearing 2 that is drivably coupled to the output shaft 3 is the ring gear $2r$ of the planetary reduction gearing 2, it is necessary to drivably couple the ring gear $2r$ to the output shaft 3 with a rotary body having a bigger diameter than the outer most peripheral surface of each of a plurality of pinion gears $2p$ (only one pinion gear $2p$ is shown in FIG. 1). On the other hand, such rotary body is not necessary to drivably connect the carrier 8 to the output shaft 3 in the first embodiment. Moreover, in the first embodiment, the carrier 8 and the output shaft 3 are integrally formed as a one-piece unitary member.

In addition, in the in-wheel drive unit of the first embodiment, the inner races of the bearings 5 and 6 are coupled to a motor casing member 9 for the motor 1, and the outer races of the bearings 5 and 6 are coupled to the planetary reduction gearing 2. More specifically, in this embodiment, the outer races of the bearings 5 and 6 are coupled to the carrier 8 of the planetary reduction gearing 2. The inner race of the bearing 5 is coupled to the motor casing member 9 via a supporting member 10. When the bearings 5 and 6 are arranged as tapered roller bearings as shown in FIG. 1, the bearings 5 and 6 support the carrier 8 by interposing the carrier 8 therebetween in the axial direction in order to support the lateral force imparted on the carrier 8. In such case, a distance (effective support span) between intersections P and Q between the center axis C and straight lines drawn substantially perpendicular to the centers of the tapered rollers of the bearings 5 and 6 becomes longer than the actual support span of the bearings 5 and 6 with respect to the carrier 8. Since the effective support span of the bearings 5 and 6 with respect to the carrier 8 can be thus lengthened, the required capacity of the bearings 5 and 6 can be reduced. Accordingly, the size of the bearings 5 and 6 used in the in-wheel drive unit can be reduced.

A sealing member 13 is provided between the supporting member 10 and an input shaft 12. The supporting member 10 supports the bearing 5 that is positioned on the inner side in the vehicle widthwise direction. The input shaft 12 is spline coupled to a rotor $1a$ of the motor 1 via a rotor hub 11. The sealing member 13 separates a space enclosing the motor 1 from a space enclosing the planetary reduction gearing 2 to enable separation of lubrication oil and drying of the space enclosing the motor 1 without increasing the size of the in-wheel drive unit. In addition, since the inner races of the bearings 5 and 6 are connected to the motor casing member 9, the sealing member 13 can be made smaller because it is possible to make a radial distance between the supporting member 10 and the input shaft 12 smaller comparing to an arrangement of an in-wheel drive unit of a second embodiment shown in FIG. 2 (discussed below).

Although the bearings 5 and 6 are illustrated as the tapered roller bearings in FIG. 1, the present invention is not limited to this arrangement. The bearings 5 and 6 can be any type of bearing that can support thrust load. For example, the bearings 5 and 6 can be arranged as angular contact ball bearings. In such case, the effective support span (a distance between points P and Q) is defined as a distance between two intersections between the center axis C and a straight line passing through a contact point between an inner race and a ball, and a contact point between the ball and an outer race of each of the angular contact ball bearings.

Furthermore, in the in-wheel drive unit of the first embodiment, the bearing 6 that is positioned on the outer side in the vehicle widthwise direction is arranged closer to the central vertical plane EX more than the bearing 5 that is positioned on the inner side in the vehicle widthwise direction. In other words, the distance from the bearing 6 to the central vertical plane EX is shorter than the distance from the bearing 5 to the central vertical plane EX. Also, as shown in FIG. 1, the outer diameter of the bearing 6 that is positioned on the outer side in the vehicle widthwise direction is bigger than the outer diameter of the bearing 5 that is positioned on the inner side in the vehicle widthwise direction.

Thus, the bearing 6 receives more vertical load than the bearing 5, and the imparted load (opposite forces in equilibrium or couple of force) due to a moment by the lateral force inputted from the tire (not shown) is substantially equal at both the bearing 5 positioned on the inner side in the vehicle widthwise direction and the bearing 6 positioned on the outer side in the vehicle widthwise direction. Therefore, capacity of the bearing 5 positioned on the inner side in the vehicle widthwise direction can be reduced, and the strength and rigidity of the supporting member 10 for the bearing 5 can be reduced. Accordingly, the size of the supporting member 10 can be reduced, thereby reducing the diameter of the motor 1 positioned on the outer circumference side of the supporting member 10.

Furthermore, in the in-wheel drive unit of the first embodiment, the bearing 6 is supported by the motor casing member 9 on the outer side in the vehicle widthwise direction of the in-wheel drive unit, while the bearing 5 is supported by the supporting member 10 on the inner side in the vehicle widthwise direction of the in-wheel drive unit and positioned inside of the motor casing member 9. A suspension device (not shown) is coupled to the motor casing member 9. Accordingly, the motor casing member 9 supports the bearing 6, on which larger load acts, positioned on the outer side in the vehicle widthwise direction. Thus, this arrangement allows to miniaturize and reduce the weight of the in-wheel unit, with a reduction in size and weight of the portion that the largest load acts on and a reduction, if possible, in size and weight of the portion that is required to have high strength and high rigidity.

In addition, by constituting the supporting member 10 in iron system materials, for example, and by constituting the motor casing member 9 in aluminum system materials, for example, it is possible to miniaturize and light weight the whole in-wheel drive unit by light weighting the motor casing member 9 that is large in diameter, in volume and in weight, by thinning the supporting member 10, and by miniaturizing the part such as the motor 1 that is arranged on the outer circumference side of the supporting member 10. Furthermore, constituting the supporting member 10 in iron system materials reduces a difference in line coefficient of expansion between the supporting member 10 and the output shaft 3 which is also usually made of iron system materials. Thus, it is possible to reduce capacity of the bearing 5 by restraining variation or fluctuation of preload acting on the bearing 5 with different temperatures as much as possible.

Furthermore, in the in-wheel drive unit of the first embodiment, a sealing member 16 is installed between the motor casing member 9 and the output shaft 3 at a portion positioned on the internal circumference side of the bearing 6 that is positioned on the outer side in the vehicle widthwise direction as shown in FIG. 1. Accordingly, installing the seal 16 restrains an increase in the axial length of the in-wheel drive unit, making it possible to miniaturize the in-wheel drive unit.

In addition, in the in-wheel drive unit of the first embodiment, the wheel rim 4 is removably coupled to the output shaft 3 via a hub flange 17. More specifically, the hub flange 17 is coupled to the output shaft 3 by spline connection, the hub flange 17 is coupled to the output shaft 3 by engaging a nut 18 with a male screw formed on the portion of the output shaft 3 in an outer side in the vehicle widthwise direction, and the wheel rim 4 is firmly connected to the hub flange 17 by a plurality of hub bolts 19. This structure allows to easily perform exchange of the hub bolts 19 and repair of the associated portions after removing the hub flange 17 from the output shaft 3, despite the fact that the motor 1 and the planetary reduction gearing 2 are arranged on the inner side of the hub flange 17 in the vehicle widthwise direction in a manner to occupy most of the space extending circumferentially along the entire periphery of the in-wheel drive unit.

In addition to the wheel rim 4, a drum 20 of the braking device 7 is fixed to the hub flange 17 with the hub bolts 19. Furthermore, a baffle plate 22 for fastening a plunger 21 of the braking device 7 is fixed to the motor casing member 9 with a plurality of bolts 23. Moreover, a stator 1b of the motor 1 is fixed to an internal circumference of the motor casing member 9, which is formed in a drum shape, in the inner side in the vehicle widthwise direction. A plurality of fins 24 for cooling the motor 1 are fixed to an outer circumference of the motor casing member 9 in the inner side in the vehicle widthwise direction. In addition, a resolver type sensor 25 is also provided to detect the number of revolutions of a rotor 1a of the motor 1 as shown in FIG. 1.

In the in-wheel drive unit of the first embodiment, each of the pinion gears 2p has a reduced diameter portion and a large diameter portion such that the pinion gears 2p are the stepped pinion type. The reduced diameter portion is engaged with the ring gear 2r on an inner side in the vehicle widthwise direction, while the large diameter portion is engaged with the sun gear 2s on an outer side in the vehicle widthwise direction. In this embodiment, the sun gear 2s is formed on an outer circumference of the input shaft 12, while the ring gear 2r is fixedly fitted in an internal perimeter surface of the supporting member 10, and the pinion gears 2p are rotatably supported by the carrier 8.

This structure allows a reduction in outer diameter of the portion of the supporting member 10 which is positioned on the interior circumference side of the motor 1. Therefore, the outer diameter of the motor 1 is reduced, and thus, the outer diameter of the overall in-wheel drive unit (excluding the wheel rim 4) is reduced.

In addition, in the in-wheel drive unit of the first embodiment, the rotor 1a of the motor 1 is positioned on the outer circumference side of the bearing 5 that is positioned on the inner side in the vehicle widthwise direction. This structure allows arranging the motor 1 to axially overlap the bearing 5, thereby reducing dimension in the axial direction of the overall in-wheel drive system.

Second Embodiment

Figure 2:
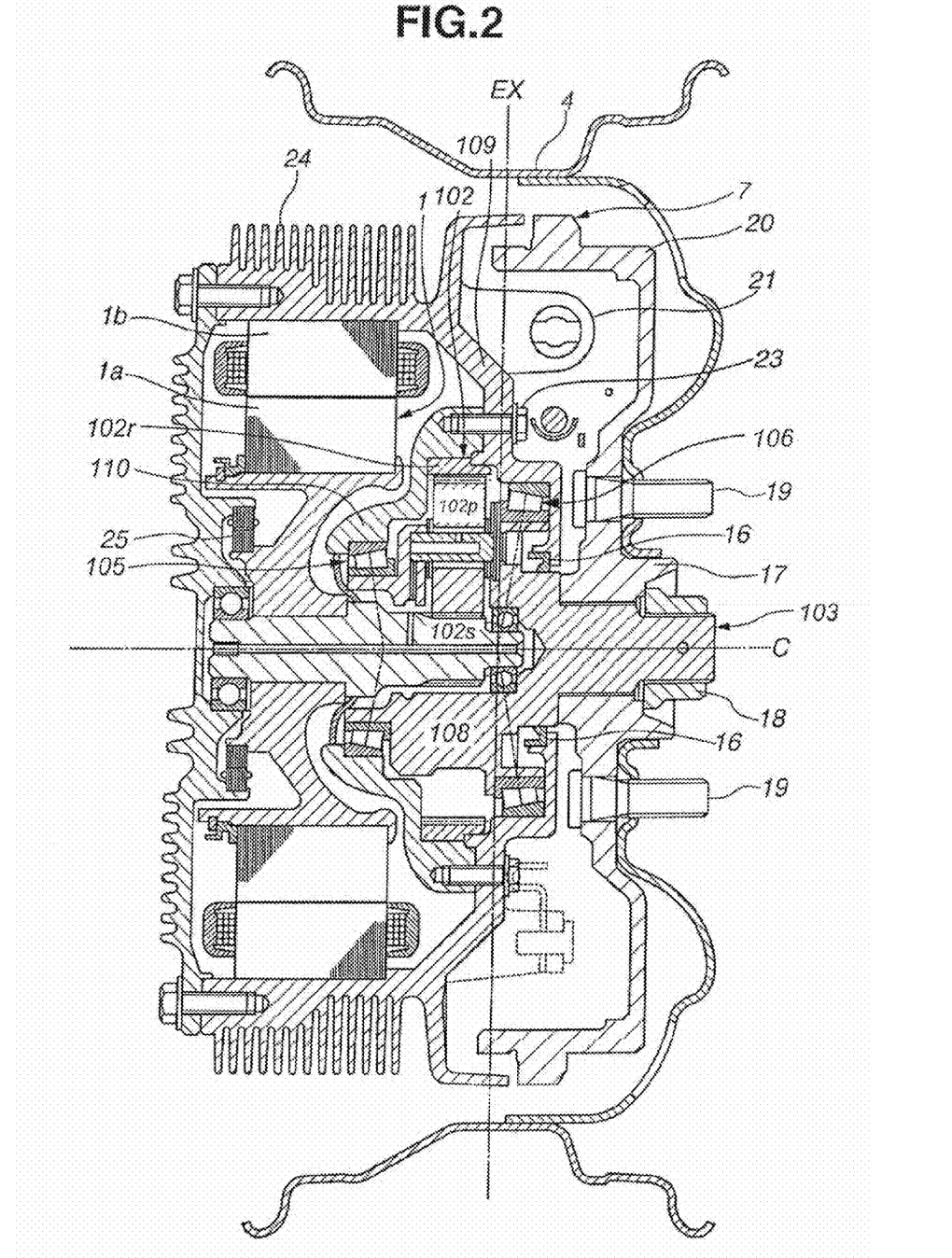
FIG. 2 is a schematic cross sectional view of an in-wheel drive unit taken along a center axis thereof in accordance with a second embodiment of the present invention.

Referring now to FIG. 2, an in-wheel drive unit in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 2 is a schematic cross sectional view of the in-wheel drive unit in accordance with the second embodiment of the present invention taken along a center axis C. In the second illustrated embodiment, a planetary reduction gearing 102 (a single planetary gear set), an output shaft 103 and a pair of bearings 105 and 106 (first and second bearings, respectively) are provided between the motor 1 and the rim 4. Basically, the planetary reduction gearing 102 includes a sun gear 102s, a ring gear 102r, one or more pinion gears 102p (only one pinion gear 102p shown in FIG. 2) and a carrier 108 that supports the one or more pinion gears 102p.

The in-wheel drive unit of the second embodiment shown in FIG. 2 differs from the in-wheel drive unit of the first embodiment shown in FIG. 1 in that outer races of the bearings 105 and 106 are coupled to a motor casing member 109 of the in-wheel drive unit, and inner races of the bearings 105 and 106 are coupled to the planetary reduction gearing 102. Moreover, the second embodiment further differs from the first embodiment in that, in the second embodiment, the ring gear 102r of the planetary reduction gearing 102 is engaged with an outer circumference surface of the pinion gears 102p (only one shown in FIG. 2). Other structures of the in-wheel drive unit of the second embodiment are basically the same as the in-wheel drive unit of the first embodiment, and thus, the detail descriptions thereof are omitted for the sake of brevity.

The in-wheel drive unit of the second embodiment includes the planetary reduction gearing 102, the output shaft 103, and the wheel rim 4. The bearings 105 and 106 are configured and arranged to rotatably support a rotary element of the planetary reduction gearing 102 drivably connected to the output shaft 103. In the in-wheel drive unit of the second embodiment, at least one of the bearings 105 and 106 (i.e., the bearing 105 in the second embodiment) is positioned on an inner side in the vehicle widthwise direction of the central vertical plane EX passing through widthwise center points along the circumferential surface of the wheel rim 4. Similarly to the in-wheel drive unit of the first embodiment shown in FIG. 1, the motor 1, the planetary reduction gearing 102, the output shaft 103 and the wheel rim 4 are operatively connected in this order such that driving force is transmitted from the motor 1 to the wheel rim 4 while reducing the speed.

As shown in FIG. 2, the outer races of the bearings 105 and 106 are coupled to the motor casing member 109 of the in-wheel drive unit and the inner races of the bearings 105 and 106 are coupled to the planetary reduction gearing 102. More specifically, the outer races of the bearings 105 and 106 are coupled to a carrier 108 of the planetary reduction gearing 102. The outer race of the bearing 105 on an inner side in the vehicle widthwise direction is supported via a supporting member 110.

This structure permits a reduction in size of the motor casing member 109 and the supporting member 110 to the minimum necessary for supporting the outer races of the bearings 105 and 106, thereby allowing miniaturization and light weight of the whole in-wheel drive unit.

Third Embodiment

Figure 3:
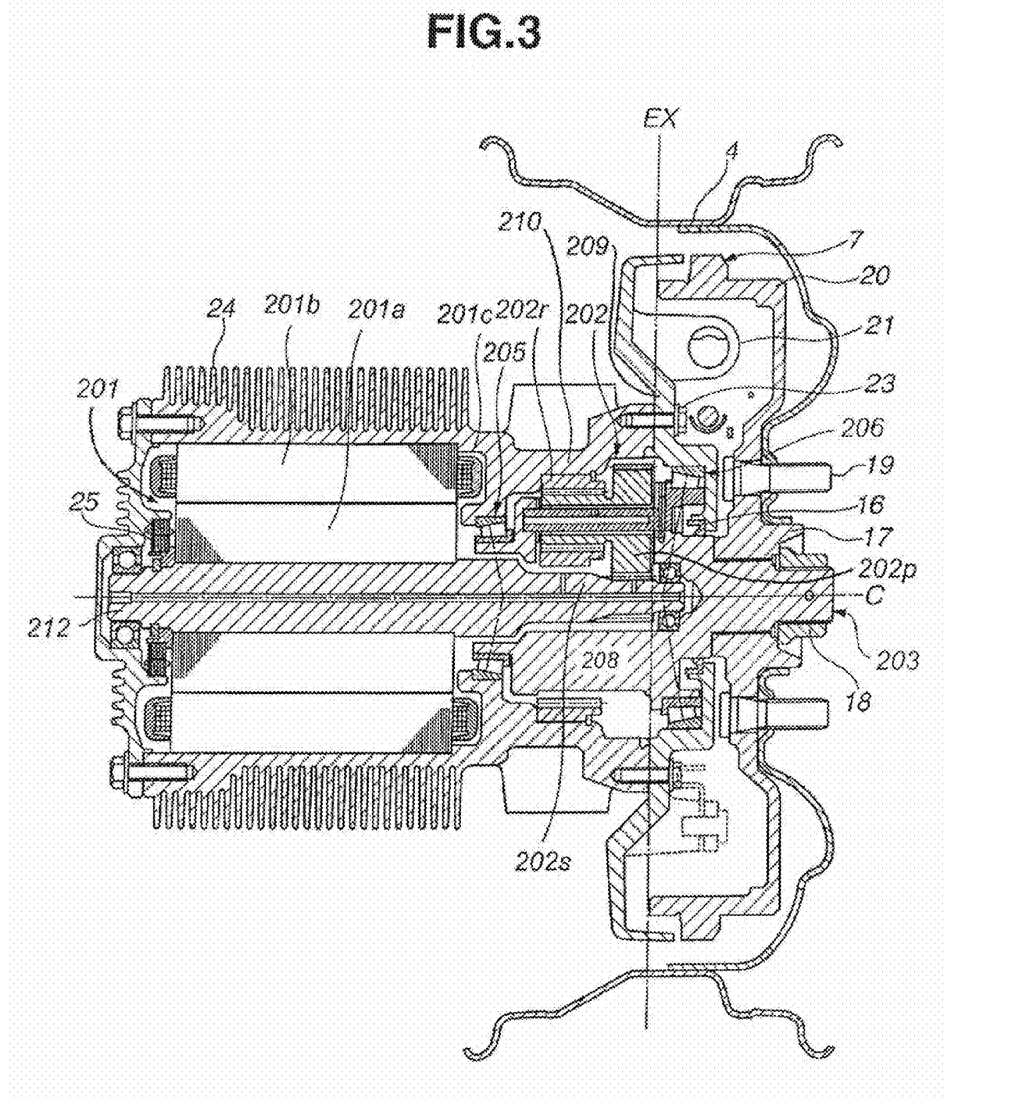
FIG. 3 is a schematic cross sectional view of an in-wheel drive unit taken along a center axis thereof in accordance with a third embodiment of the present invention.

Referring now to FIG. 3, an in-wheel drive unit in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

FIG. 3 is a schematic cross sectional view the in-wheel drive unit in accordance with the third embodiment of the present invention taken along a center axis C. In the third illustrated embodiment, the in-wheel drive unit basically includes a motor 201 with a rotor 201a and a stator 201b, a planetary reduction gearing 202 (a single planetary gear set), an output shaft 203 attached to the wheel rim 4, a pair of bearings 205 and 206 (first and second bearings, respectively) and the braking device 7. Basically, the planetary reduction gearing 202 includes a sun gear 202s, a ring gear 202r, one or more pinion gears 202p (only one pinion gear 202p shown in FIG. 3) and a carrier 208 that supports the one or more pinion gears 202p.

The in-wheel drive unit of the third embodiment shown in FIG. 3 differs from the in-wheel drive unit of the first embodiment shown in FIG. 1 in that a coil end 201c of the stator 201b of the motor 201 is disposed radially outwardly with respect to the first bearing 205 that is disposed in an inner side in the vehicle widthwise direction, instead of disposing the rotor 1a of the motor 1 on the outer circumference side of the bearing 5 as in the first embodiment shown in FIG. 1. Moreover, the in-wheel drive unit of the third embodiment differs from the in-wheel drive unit of the first embodiment in that outer races of the bearings 205 and 206 are coupled to a motor casing member 209 of the in-wheel drive unit, and inner races of the bearings 205 and 206 are coupled to the planetary reduction gearing 202. The motor casing member 209 is fixed on an outer circumference side of a supporting member 210 similar to the first embodiment. Other structures of the in-wheel drive unit of the third embodiment are basically the same as the in-wheel drive unit of the first embodiment, and thus, the detail descriptions thereof are omitted for the sake of brevity.

Thus, the in-wheel drive unit of the third embodiment includes the motor 201, the planetary reduction gearing 202, the output shaft 203, and the wheel rim 4. The bearings 205 and 206 are configured and arranged to rotatably support a rotary element of the planetary reduction gearing 202 drivably connected to the output shaft 203. In the in-wheel drive unit of the third embodiment, at least one of the bearings 205 and 206 (i.e., the bearing 205 in the third embodiment) is positioned on an inner side in the vehicle widthwise direction of the central vertical plane EX passing through widthwise center points along the circumferential surface of the wheel rim 4. Similarly to the in-wheel drive unit of the first embodiment shown in FIG. 1, the motor 201, the planetary reduction gearing 202, the output shaft 203 and the wheel rim 4 are operatively connected in this order such that driving force is transmitted from the motor 201 to the wheel rim 4 while reducing the speed.

As shown in FIG. 3, the coil end 201c of the stator 201b of the motor 201 is disposed on the outer circumference side of the bearing 205 that is positioned on an inner side in the vehicle widthwise direction. This structure allows arranging the motor 201 to axially overlap the bearing 205, thus making it possible to slightly reduce the axial length of the overall in-wheel drive unit.

In the in-wheel drive unit of the third embodiment, the motor 201 is arranged on an inner side of the bearing 205 with respect to the vehicle widthwise direction, and the rotor 201a is directly coupled to an input shaft 212 by spline connection without a rotor hub as different from the structures of the in-wheel drive units shown in FIGS. 1 and 2. Such arrangement of the in-wheel drive unit of the third embodiment is advantageous when using a high power and large capacity motor.

Fourth Embodiment

Figure 4:
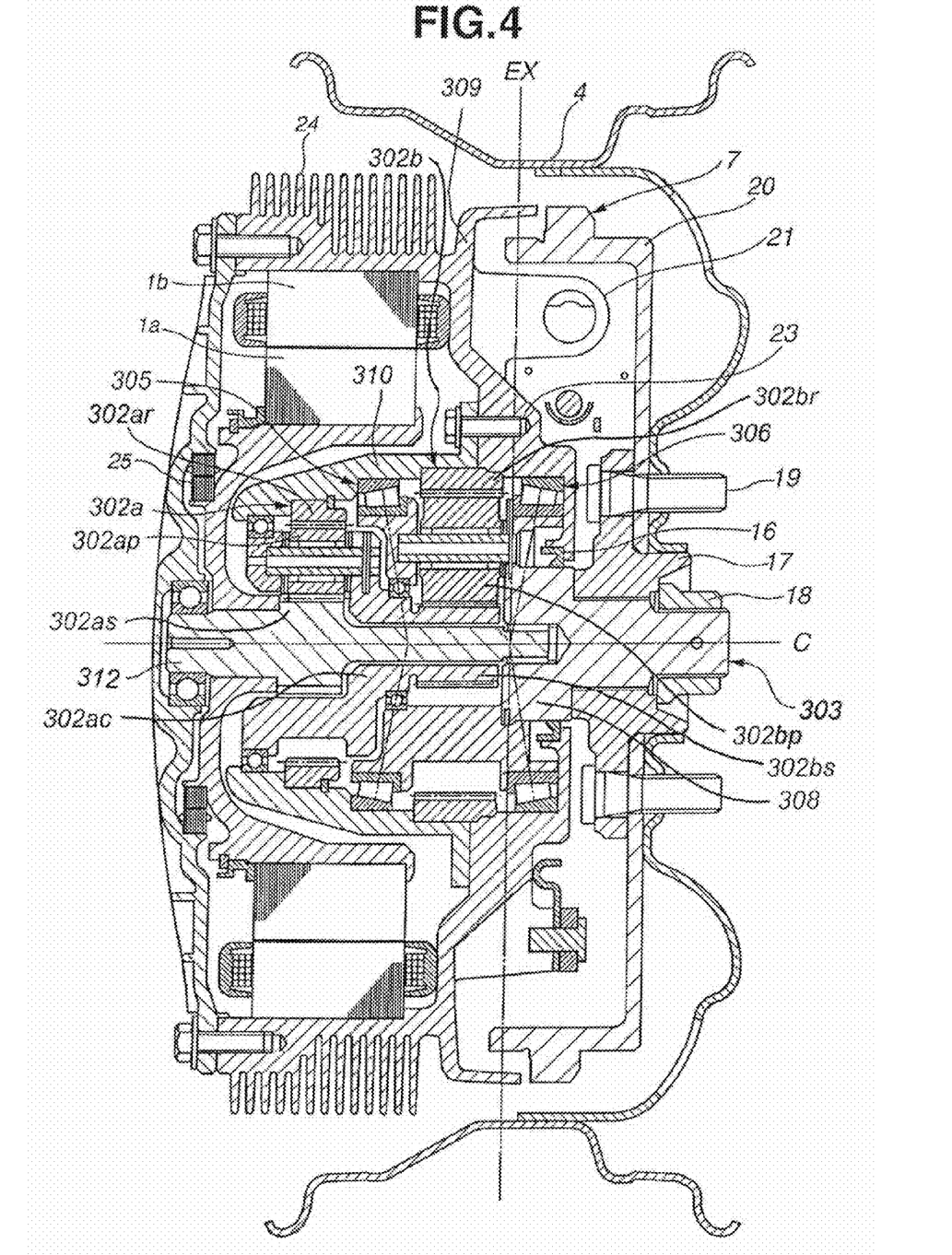
FIG. 4 is a schematic cross sectional view of an in-wheel drive unit taken along a center axis thereof in accordance with a fourth embodiment of the present invention.

Referring now to FIG. 4, an in-wheel drive unit in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

FIG. 4 is a schematic cross sectional view of the in-wheel drive unit in accordance with the fourth embodiment of the present invention taken along a center axis C. In the fourth illustrated embodiment, a planetary reduction gearing 302 (two planetary gear sets) and a pair of bearings 305 and 306 (first and second bearings, respectively) are provided between the motor 1 and the rim 4. Basically, a first planetary gear set 302a of the planetary reduction gearing 302 includes a sun gear 302as, a ring gear 302ar, one or more pinion gears 302ap (only one pinion gear 302ap shown in FIG. 4) and a carrier 302ac that supports the one or more pinion gears 302ap. The second planetary gear set 302b of the planetary reduction gearing 302 includes a sun gear 302bs, a ring gear 302br, one or more pinion gears 302 bp (only one pinion gear 302bp shown in FIG. 4) and a carrier 308 that supports the one or more pinion gears 302bp.

The in-wheel drive unit of the fourth embodiment shown in FIG. 4 differs from the in-wheel drive unit of the first embodiment shown in FIG. 1 in that the planetary reduction gearing 302 includes two planetary gear sets 302a and 302b. Moreover, the first planetary gear set 302a is disposed on an inner side of a bearing 305 that is positioned on an inner side with respect to the vehicle widthwise direction. Furthermore, outer races of the bearings 305 and 306 are coupled to a casing 309 and inner races of the bearings 305 and 306 are coupled to the planetary reduction gearing 302. The outer diameters of the bearings 305 and 306 are substantially the same as shown in FIG. 4. Moreover, the fourth embodiment further differs from the first embodiment in that, in the fourth embodiment, the ring gear 302br of the planetary gear set 302b of the planetary reduction gearing 302 is engaged with an outer circumference surface of each of the pinion gears 302bp (only shown in FIG. 4). Other structures of the in-wheel drive unit of the third embodiment are basically the same as the in-wheel drive unit of the first embodiment, and thus, the detail descriptions thereof are omitted for the sake of brevity.

Thus, the in-wheel drive unit of the fourth embodiment includes the motor 1, the planetary reduction gearing 302, the output shaft 303, and the wheel rim 4. The bearings 305 and 306 are configured and arranged to rotatably support a rotary element of the planetary reduction gearing 302 drivably connected to the output shaft 303. In the in-wheel drive unit of the fourth embodiment, at least one of the bearings 305 and 306 (i.e., the bearing 305 in the fourth embodiment) is positioned on an inner side in the vehicle widthwise direction of the central vertical plane EX passing through widthwise center points along a circumferential surface of the wheel rim 4. Similarly to the in-wheel drive unit of the first embodiment shown in FIG. 1, the motor 1, the planetary reduction gearing 302, the output shaft 303 and the wheel rim 4 are operatively connected in this order such that driving force is transmitted from the motor 1 to the wheel rim 4 while reducing the speed.

In the in-wheel drive unit of the fourth embodiment, the planetary gear set 302a is positioned on an inner side in the vehicle widthwise direction. A circumference portion of an input shaft 312 is integrally formed with the sun gear 302as. The ring gear 302ar is fitted into the interior circumference side of a supporting member 310. The carrier 302ac rotatably retains the pinion gears 302ap. The planetary gear set 302b is positioned on an outer side in the vehicle widthwise direction. The sun gear 302bs is formed as an integral part of the carrier 302ac of the planetary gear set 302a. The ring gear 302br is fitted into the interior circumference side of the supporting member 310. The carrier 308 rotatably retains the pinion gears 302bp. Here, the carrier 308 and the output shaft 303 are integrally formed as a one-piece unitary member as in the carrier 8 and the output shaft 3 of the first embodiment.

By forming the planetary reduction gearing 302 with two planetary gear sets 302a and 302b, a diameter of each of the planetary gear sets 302a and 302b can be made smaller comparing to when the planetary reduction gearing includes a single planetary gear set in order to obtain the same reduction ratio. Thus, the outer diameter of the planetary reduction gearing 302 can be reduced, and the outer diameter of the motor 301, which is disposed on an outer circumference side of the planetary reduction gearing 302, can be reduced. Therefore, the overall diameter of the in-wheel drive unit except for the wheel rim 4 can be reduced. Of course, more than two planetary gear sets can be combined to form the planetary reduction gearing of the present invention if a space in the axial direction permits.

The in-wheel drive unit according to the present invention is suitable for application to vehicles such as electric vehicles, and provides a more compact in-wheel drive unit.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An in-wheel drive unit comprising:
    a motor including a rotor that is configured and arranged to be rotatably driven about a rotational axis;
    a motor casing member at least partially covering the motor;
    a planetary gear set arranged coaxially about the rotational axis of the rotor, the planetary gear set including a sun gear coupled to the rotor, a ring gear supported on the motor casing member, at least one pinion gear configured and arranged to rotate between the sun gear and the ring gear, and a carrier rotatably supporting the pinion gear relative to the carrier about a center rotational axis of the pinion gear;
    a hub flange fixedly coupled to the carrier; and
    first and second bearings rotatably supporting the hub flange and the pinion gear, the first and second bearings being disposed on opposite sides of the pinion gear with respect to an axial direction of the pinion gear, the first and second bearings including first races that are relatively non-rotatably coupled to coupling faces of the carrier, respectively, with at least one of the coupling faces of the carrier being located at a radial outward location of the rotational axis of the rotor with respect to the center rotational axis of the pinion gear.

2. The in-wheel drive unit as recited in claim 1, wherein the carrier of the planetary gear set includes an output shaft with the hub flange fixedly coupled to the carrier via the output shaft.

3. The in-wheel drive unit as recited in claim 1, wherein each of the first and second bearings includes an outer race that is coupled to the planetary gear set and an inner race that is coupled to the motor casing member.

4. The in-wheel drive unit as recited in claim 1, wherein the first bearing is disposed on an inner side of the pinion gear and the second bearing is disposed on an outer side of the pinion gear with respect to a vehicle widthwise direction, the first bearing having a smaller outer diameter than the second bearing.

5. The in-wheel drive unit as recited in claim 1, wherein the first bearing is disposed on an inner side of the pinion gear and the second bearing is disposed on an outer side of the pinion gear with respect to a vehicle widthwise direction, the first bearing being supported on the motor casing member via a supporting member disposed on an inner side of the motor casing member with respect to the vehicle widthwise direction.

6. The in-wheel drive unit as recited in claim 1, further comprising
an output shaft fixedly coupled to the planetary gear set, and
a wheel rim removably coupled to the output shaft via the hub flange.

7. The in-wheel drive unit as recited in claim 1, wherein the rotor of the motor is positioned on an outer circumferential side of the first bearing that is disposed on an inner side of the pinion gear with respect to a vehicle widthwise direction.

8. The in-wheel drive unit as recited in claim 1, wherein the motor includes a stator with a coil end being positioned on an outer circumferential side of the first bearing that is disposed on an inner side of the pinion gear with respect to a vehicle widthwise direction.

9. An in-wheel drive unit comprising:
a motor including a rotor that is configured and arranged to be rotatably driven about a rotational axis;
a motor casing member at least partially covering the motor;
a planetary gear set arranged coaxially about the rotational axis of the rotor, the planetary gear set including a sun gear coupled to the rotor, a ring gear supported on the motor casing member, at least one pinion gear configured and arranged to rotate between the sun gear and the ring gear, and a carrier supporting the pinion gear;
a hub flange fixedly coupled to the carrier; and
first and second bearings rotatably supporting the hub flange and the pinion gear, the first and second bearings being disposed on opposite sides of the pinion gear with respect to an axial direction of the pinion gear, each of the first and second bearings including a first race relatively non-rotatably coupled to the carrier,
each of the first and second bearings including an outer race that is coupled to the motor casing member and an inner race that is coupled to the planetary gear set.

10. An in-wheel drive unit comprising:
a motor including a rotor that is configured and arranged to be rotatably driven about a rotational axis;
a motor casing member at least partially covering the motor;
a planetary gear set arranged coaxially about the rotational axis of the rotor, the planetary gear set including a sun gear coupled to the rotor, a ring gear supported on the motor casing member, at least one pinion gear configured and arranged to rotate between the sun gear and the ring gear, and a carrier supporting the pinion gear;
a hub flange fixedly coupled to the carrier;
first and second bearings rotatably supporting the hub flange and the pinion gear, the first and second bearings being disposed on opposite sides of the pinion gear with respect to an axial direction of the pinion gear, each of the first and second bearings including a first race relatively non-rotatably coupled to the carrier; and
a wheel rim disposed about an outer circumference side of the planetary gear set having a central vertical plane passing through widthwise center points located along a circumferential surface of the wheel rim,
the first bearing being disposed on an inner side of the pinion gear and the second bearing being disposed on an outer side of the pinion gear with respect to a vehicle widthwise direction such that a first axial distance from the first bearing to the central vertical plane of the wheel rim is longer than a second axial distance from the second bearing to the central vertical plane of the wheel rim as measured perpendicularly from the central vertical plane of the wheel rim.

11. An in-wheel drive unit comprising:
a motor including a rotor that is configured and arranged to be rotatably driven about a rotational axis;
a motor casing member at least partially covering the motor;
a planetary gear set arranged coaxially about the rotational axis of the rotor, the planetary gear set including a sun gear coupled to the rotor, a ring gear supported on the motor casing member, at least one pinion gear configured and arranged to rotate between the sun gear and the ring gear, and a carrier supporting the pinion gear;
a hub flange fixedly coupled to the carrier;
first and second bearings rotatably supporting the hub flange and the pinion gear, the first and second bearings being disposed on opposite sides of the pinion gear with respect to an axial direction of the pinion gear, each of the first and second bearings including a first race relatively non-rotatably coupled to the carrier; and
an output shaft coupled to the motor casing member via a sealing member at a position radially inward of the second bearing that is disposed on an outer side of the pinion gear with respect to a vehicle widthwise direction.

12. An in-wheel drive unit comprising:
a motor including a rotor that is configured and arranged to be rotatably driven about a rotational axis;
a motor casing member at least partially covering the motor;
a planetary gear set arranged coaxially about the rotational axis of the rotor, the planetary gear set including a sun gear coupled to the rotor, a ring gear supported on the motor casing member, at least one pinion gear configured and arranged to rotate between the sun gear and the ring gear, and a carrier supporting the pinion gear;
a hub flange fixedly coupled to the carrier;
first and second bearings rotatably supporting the hub flange and the pinion gear, the first and second bearings being disposed on opposite sides of the pinion gear with respect to an axial direction of the pinion gear, each of the first and second bearings including a first race relatively non-rotatably coupled to the carrier; and
an additional planetary gear set operatively coupled to the rotor.

13. An in-wheel drive unit comprising:
a motor including a rotor that is configured and arranged to be rotatably driven about a rotational axis;
a motor casing member at least partially covering the motor;

a planetary gear set arranged coaxially about the rotational axis of the rotor, the planetary gear set including a sun gear coupled to the rotor, a ring gear supported on the motor casing member, at least one pinion gear configured and arranged to rotate between the sun gear and the ring gear, and a carrier supporting the pinion gear;

a hub flange fixedly coupled to the carrier; and first and second bearings rotatably supporting the hub flange and the pinion gear, the first and second bearings being disposed on opposite sides of the pinion gear with respect to an axial direction of the pinion gear, the pinion gear including a reduced diameter portion engaged with the ring gear on an inner side in a vehicle widthwise direction, and a larger diameter portion engaged with the sun gear on an outer side in the vehicle widthwise direction.

14. An in-wheel drive unit comprising:

a motor including a rotor that is configured and arranged to be rotatably driven about a rotational axis;

a motor casing member at least partially covering the motor;

a planetary gear set arranged coaxially about the rotational axis of the rotor, the planetary gear set including a sun gear coupled to the rotor, a ring gear supported on the motor casing member, at least one pinion gear configured and arranged to rotate between the sun gear and the ring gear, and a carrier supporting the pinion gear;

a hub flange fixedly coupled to the carrier;

first and second bearings rotatably supporting the hub flange and the pinion gear, the first and second bearings being disposed on opposite sides of the pinion gear with respect to an axial direction of the pinion gear, each of the first and second bearings including a first race relatively non-rotatably coupled to the carrier; and a wheel rim disposed on an outer circumference portion of the planetary gear set with a central vertical plane passing through widthwise center points located along a circumferential surface of the wheel rim, at least one of the first and second bearings being disposed on an inner side of the central vertical plane of the wheel rim with respect to a vehicle widthwise direction.

15. An in-wheel drive unit comprising:

driving force generating means for generating a driving force to rotate a rotor;

casing means for at least partially covering the driving force generating means;

planetary gear reducing means for transmitting the driving force from the driving force generating means to a wheel rim while reducing the speed by using relative rotations between a sun gear coupled to the rotor, a ring gear supported on the casing means and at least one pinion gear supported on a carrier with the carrier rotatably supporting the pinion gear relative to the carrier about a center rotational axis of the pinion gear;

wheel rim coupling means for fixedly coupling the wheel rim to the planetary gear reducing means; and bearing means for rotatably supporting the wheel rim coupling means and the pinion gear at positions disposed on opposite sides of the pinion gear with respect to an axial direction of the pinion gear, the bearing means including a pair of first races that are relatively non-rotatably coupled to coupling faces of the carrier at the positions disposed on the opposite sides of the pinion gear with respect to the axial direction of the pinion gear, respectively, with at least one of the coupling faces of the carrier being located at a radial outward location of a rotational axis of the rotor with respect to the center rotational axis of the pinion gear.

* * * * *